United States Patent [19]

Riihimäki

[11] Patent Number: 5,588,212
[45] Date of Patent: Dec. 31, 1996

[54] SAFETY-BELT CUTTER

[76] Inventor: Antero Riihimäki, Soukankuja 4 B, FIN-02360, Espoo, Finland

[21] Appl. No.: 380,424

[22] Filed: Jan. 30, 1995

Related U.S. Application Data

[63] Continuation-in-part of Ser. No. 23,084, Feb. 26, 1993, abandoned.

[30] Foreign Application Priority Data

Mar. 17, 1992 [FI] Finland ................... U920219

[51] Int. Cl.⁶ ........................ B26B 29/06; B60R 22/32
[52] U.S. Cl. ................... 30/123; 30/285; 30/290; 30/296.1
[58] Field of Search ................ 30/285, 296.1, 30/298.4, 280, 286, 290, 123, 124

[56] References Cited

U.S. PATENT DOCUMENTS

| | | | |
|---|---|---|---|
| 4,563,815 | 1/1986 | Hoffelner | 30/296 A |
| 4,860,861 | 7/1987 | Meuer | 30/296 A |
| 5,085,449 | 2/1992 | Hudson | 280/801 |
| 5,129,570 | 7/1992 | Schulze et al. | 227/19 |

FOREIGN PATENT DOCUMENTS

| | | |
|---|---|---|
| 2289213 | 5/1976 | France . |
| 2581944 | 11/1986 | France . |
| 2647069 | 11/1990 | France . |
| 2841404 | 4/1980 | Germany . |
| 3443205A1 | 7/1986 | Germany . |

*Primary Examiner*—Eugenia Jones
*Assistant Examiner*—Charles Goodman
*Attorney, Agent, or Firm*—Klarquist, Sparkman, Campbell, Leigh & Whinston, LLP

[57] ABSTRACT

An emergency safety-belt cutter is provided with frame having an opening. A slide is disposed within the frame opening for receiving and closely supporting the safety-belt. The slide constrains the safety-belt to keep the safety-belt from wrinkling during the cutting movement of said blade. A cutting blade having a cutting edge is attached to the frame and protrudes into the opening. The blade engages and cuts the safety-belt supported in the slide upon movement of said frame transversely over said safety-belt. Furthermore, a guard means is detachably secured to the frame to prevent cutting the safety-belt during inadvertent pulling of the frame. The guard means includes a sheath positioned in front of the cutting blade cutting edge to protectively sheath the blade. The guard means is detachable from the frame to unsheathe the cutting edge to permit cutting of the safety belt.

15 Claims, 3 Drawing Sheets

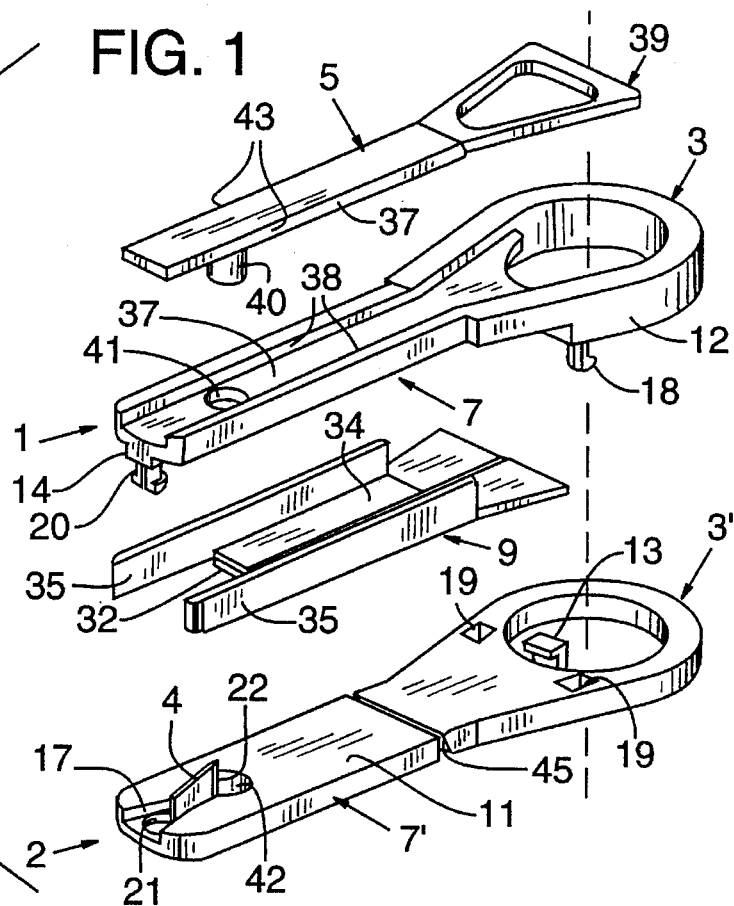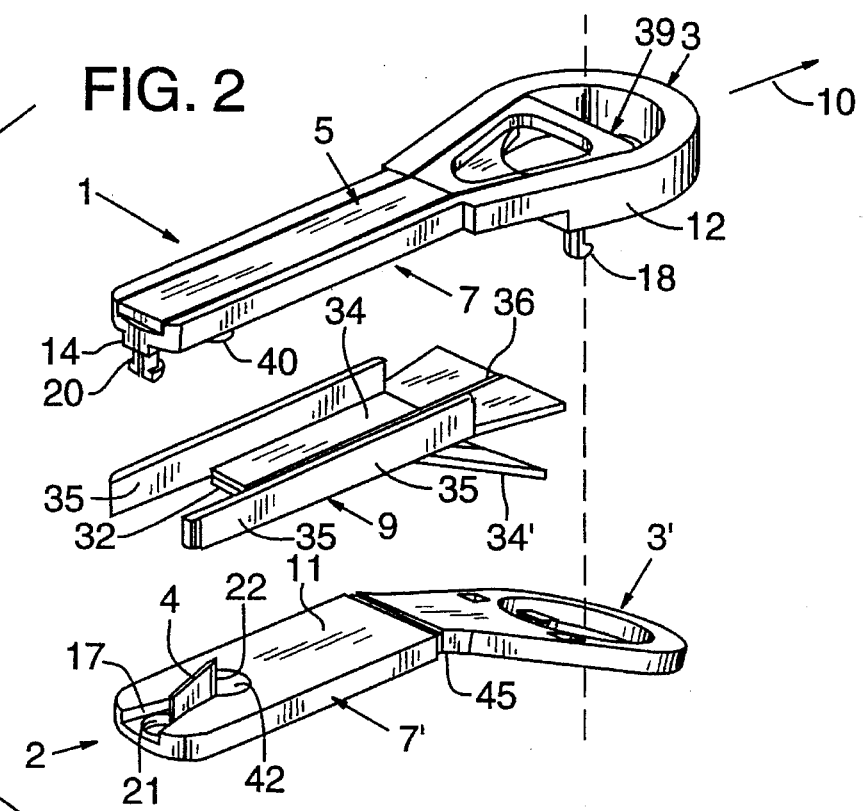

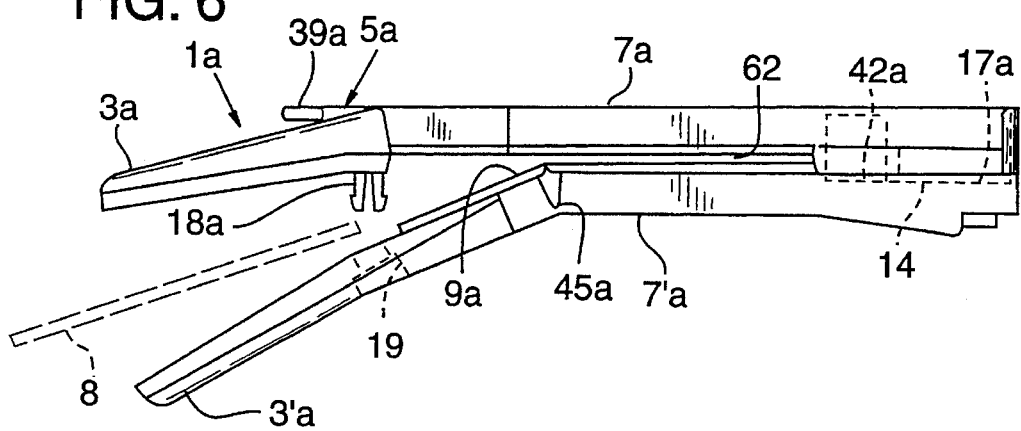
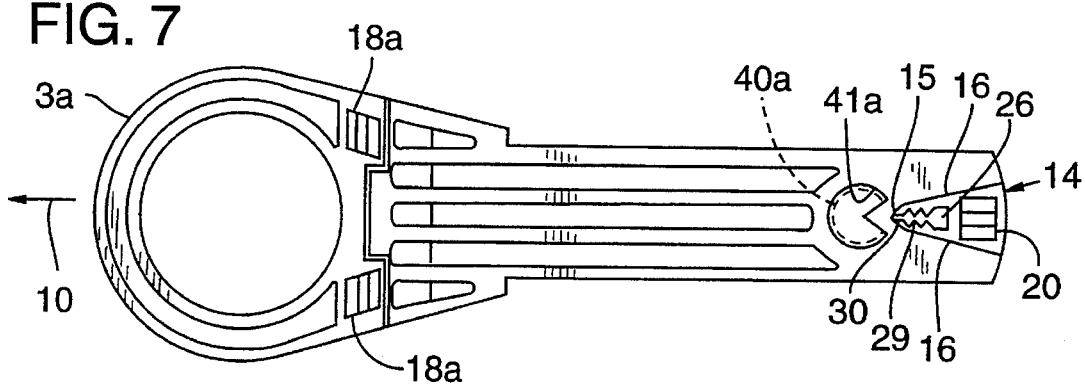
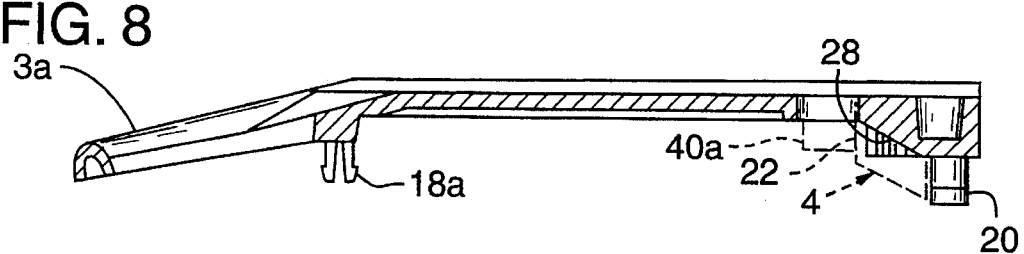
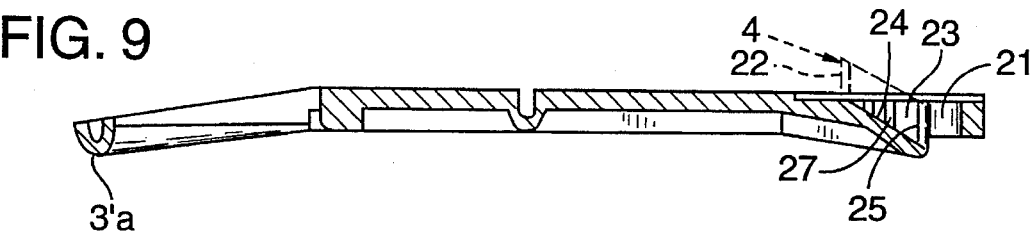

SAFETY-BELT CUTTER

This application is a continuation-in-part of U.S. patent application Ser. No. 08/023,084, filed Feb. 26, 1993 now abandoned.

FIELD OF THE INVENTION

The present invention relates to safety-belt cutters, and in particular to safety-belt cutters for use in emergencies.

BACKGROUND AND SUMMARY OF THE INVENTION

Safety-belts have proved successful in preventing injury and death to vehicle occupants resulting from vehicle accidents. However, safety-belts can pose a risk to vehicle occupants if not easily releasable after an accident or during an emergency. For instance, a safety-belt lock release may be rendered inoperable from damage sustained during an accident. In serious accidents the vehicle occupant or crushed parts of the vehicle may impede access to the safety-belt lock release. The wrecked vehicle may also be resting on its roof, thereby inhibiting access to the safety-belt lock release.

In all of these situations, the vehicle occupant is effectively trapped in the vehicle if the safety-belt cannot be released. Such trapping is extremely dangerous when the vehicle occupant is in need of immediate medical attention, or when the risk of vehicle fire exists after an accident.

To release such a trapped occupant, devices such as heavy-duty scissors or knives may be used to sever an unreleasable safety-belt. However, such devices are not usually available to the trapped occupant or would-be rescuers immediately after an accident.

To solve this problem, cutting devices have been developed which attach directly and permanently to a safety-belt. Such devices are useable by either the trapped occupant or a rescuer to sever a locked safety-belt to free the occupant. Unfortunately, such cutting devices have not proved completely satisfactory in severing safety-belts in all situations. For instance, if the safety-belt is not taut, the safety-belt tends to wrinkle within such cutting devices during the cutting operation. Such wrinkling tends to jam the cutting devices to prevent or slow the severing of the safety-belt.

In light of the above problems, it is an object of the present invention to provide a safety-belt cutter that mounts directly to a safety-belt and is conveniently operable to quickly sever the safety-belt, regardless of the tension in the safety-belt.

It is another object of the present invention to provide a compact, inexpensive, durable and lightweight safety-belt cutter that mounts directly to a safety-belt.

In accordance with one preferred embodiment of the invention, an emergency safety-belt cutter is provided with frame having an opening. A slide is disposed within the frame opening for receiving and closely supporting the safety-belt. The slide constrains the safety-belt to keep the safety-belt from wrinkling during the cutting movement of said blade. A cutting blade having a cutting edge is attached to the frame and protrudes into the opening. The blade engages and cuts the safety-belt supported in the slide upon movement of said frame transversely over said safety-belt. Furthermore, a guard means is detachably secured to the frame to prevent cutting the safety-belt during inadvertent pulling of the frame. The guard means includes a sheath positioned in front of the cutting blade cutting edge to protectively sheath the blade. The guard means is detachable from the frame to unsheathe the cutting edge to permit cutting of the safety belt.

Other aspects of the present invention will become apparent to those skilled in the art from the description of the invention, which is presented by way of example and not as a limitation of the present invention.

BRIEF DESCRIPTION OF THE DRAWINGS

FIG. 1 is an exploded perspective view of a safety-belt cutter in accordance with one preferred embodiment of the present invention.

FIG. 2 is another exploded perspective view of the safety-belt cutter shown in FIG. 1, with hinged portions of a slide and a lower frame portion of the safety-belt cutter shown flexed.

FIG. 6 is a side elevational view of a safety-belt cutter in accordance with another preferred embodiment of the present invention.

FIG. 7 is a bottom plan view of an upper frame portion of the safety-belt cutter shown in FIG. 6.

FIG. 8 is a side elevational view of the upper frame portion shown in FIG. 7.

FIG. 9 is a side elevational view of a lower frame portion of the safety-belt cutter shown in FIG. 6.

DETAILED DESCRIPTION OF PREFERRED EMBODIMENTS

Figure 3A:
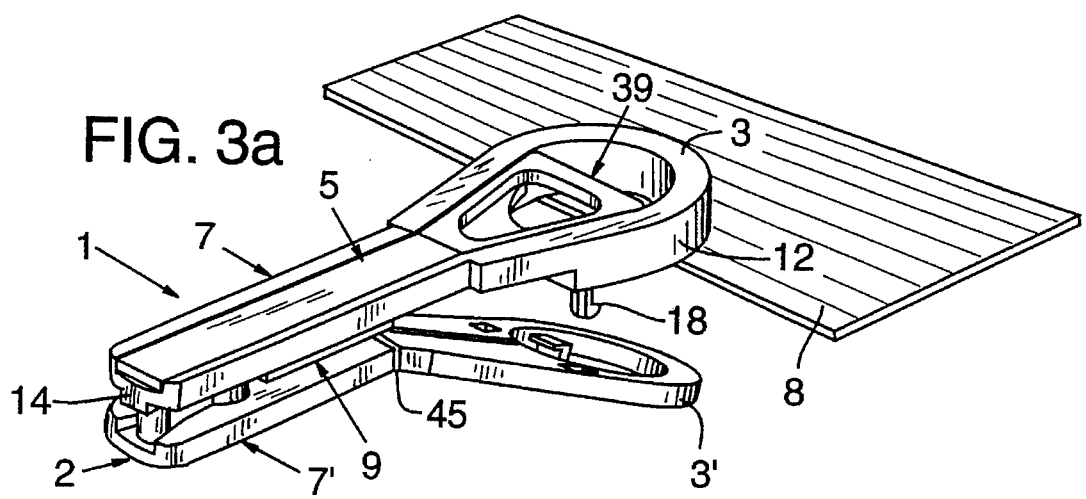
FIG. 3a is an exploded perspective view of the safety-belt cutter shown in FIG. 1, with the safety-belt cutter in the process of installation on a safety-belt.
Figure 3B:
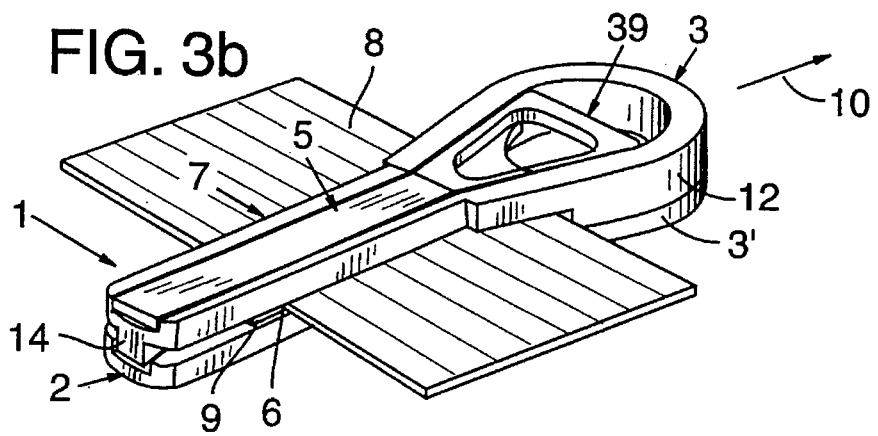
FIG. 3b is an exploded perspective view of the safety-belt cutter shown in FIG. 1, with the safety-belt cutter installed on a safety-belt.

FIGS. 3a and 3b generally show a safety-belt cutter 1 in accordance with one preferred embodiment of the present invention. The safety-belt cutter has an elongate frame 2 with a transverse opening 6 that receives a safety-belt 8. The safety-belt is mounted a U-shaped slide 9 that is disposed within the frame opening 6. A pulling ring 3, 3' is defined at a first end of the frame and defines a forward pulling direction 10 for cutting the safety-belt. A cutting blade 4 is mounted within the frame to extend across the opening at the opposite second end of the frame, adjacent the U-shaped slide. A guard means 5 is detachably mounted to the frame to sheath the cutting blade to avoid inadvertent cutting of the safety-belt. The safety-belt 8 is cut by detaching the guard means 5 and pulling the ring in the pulling direction 10. The U-shaped slide 9 remains "hooked" over the safety-belt as the frame 2 is pulled transversely over the safety-belt 8 to transversely cut the safety-belt with the cutting blade 4. The cutting blade cuts through the slide as the safety-belt is cut.

In the following discussion, two similar embodiments of preferred cutters are referenced. A first preferred embodiment 1 is shown in FIGS. 1–5, and a second preferred embodiment 1a is shown in FIGS. 6–9. Elements that are identical in the first and second embodiments are indicated with identical reference numbers. Elements referenced in the second embodiment that are modified from corresponding elements of the first embodiment have the letter "a" added to the reference number of the first embodiment.

As shown in FIGS. 1 and 3a, the frame is constructed from an upper frame portion 7 and a lower frame portion 7'. The frame portions 7, 7' are configured so as to form the opening 6 between a lower surface of the upper frame portion 7, and an upper surface 11 of the lower frame portion 7'. The upper and lower frame portions each have one of a pair of pulling rings 3, 3', respectively, at first ends The pulling rings 3, 3' align when the frame portions 7, 7' are attached together so that they may both be pulled during the cutting operation. The upper frame pulling ring 3 is relatively thick to form a platform 12 protruding downward from the lower surface of the upper frame portion 7. In the assembled safety-belt cutter (see FIG. 3b), the pulling ring platform 12 abuts the lower frame pulling ring 3' to define one end of the opening 6 between the upper and lower frame portions.

A triangular wedge 14 extends downwardly from a central position on the second end of the upper frame portion 3. FIGS. 6, 7 and 8 best show a preferred wedge 4 of the second embodiment 1a, which for the purposes of description is considered identical to the wedge of the safety-belt cutter shown in FIGS. 1, 2, 3a and 3b. FIG. 7 shows that apex 15 of the triangular wedge is directed toward the pulling ring 3a. The triangular wedge 14 has vertical sidewalls 16 that diverge diagonally from the wedge apex 15. The triangular wedge 14 is received in a recess 17 in the upper surface 11 of the lower frame portion (see FIG. 1) when the cutter is assembled. As shown in FIG. 3b, the triangular wedge 14 defines the opposite end of the opening 6 between the upper and lower frame portions 7, 7'.

The safety-belt cutter frame portions are preferably are secured together by a tenon joints. As shown in FIG. 1, the upper frame has a pair of tenons 18 adjacent the pulling ring (only one of which is shown). The tenons generally have an L-shaped snap which faces toward the pulling direction 10. The tenons 18 snap into a pair of tenon holes 19 defined in the lower frame adjacent the pulling ring 3'. A central snap 13 (shown only in FIG. 1) with an L-shaped profile facing away from the cutting direction 10 may extend upward from the lower ring 3' to snap over an edge of the upper ring 3. A single tenon 20 with a pair of back-to-back L-shaped snaps extends from the upper frame portion triangular wedge 14. The single tenon 20 snaps into a single tenon hole 21 defined in the second end of the lower frame portion 7'.

In the second embodiment shown in FIGS. 6, 7 and 8, the pair of tenons 18a adjacent the pulling ring are each configured with a back-to-back pair of L-shaped snaps.

As best shown in FIGS. 7 and 8, the blade 4 extends from the second end of the lower frame portion 7'a. The blade 4 protrudes into the opening 6a and has a vertically-oriented cutting edge 22 that faces the pulling ring 3'. As shown in FIG. 9, the blade preferably has a parallelogrammic shape, with the cutting edge 22 formed on a first end edge of the parallelogram. The blade is preferably stainless steel, and has a thin, "razor-blade" type form. The blade is recessed within a lower slot 23 in the second end of the lower frame portion. The slot has a triangular cross-section, with a sloped bottom wall 24 and a vertical end wall 25. The lower slot may have a plurality of opposing ribs 27 that firmly engage the blade. The slot 23 receives about the lower half of the parallelogrammic blade 4, such that the cutting edge 22 extends vertically into the opening 6a between the frame portions 7a, 7'a.

As shown in FIGS. 7 and 8, a substantial portion of the upper half of the blade 4 is received with an upper slot 26 defined within the triangular wedge. The upper slot is centrally defined in the triangular wedge 14, with a sloped top wall 28 that abuts the upper longitudinal edge of the blade. The upper slot may have a plurality of opposing ribs 29 that firmly engage the blade. The upper slot further has a vertical forward opening 30 along the apex 15 of the wedge, through which the blade cutting edge 22 protrudes towards the pulling direction 10.

With the upper and lower frame portions attached together at the tenon joints, the blade 4 is snugly supported within the upper and lower slots. The vertical end wall 25 of the lower slot and the sloped top wall 28 of the upper slot engage behind and support the blade during the cutting operation.

Referring to FIGS. 1 and 3a, the slide 9 is positioned within the opening 6 between the frame portions 7, 7' to support the safety-belt 8 and keep the safety-belt unwrinkled and taut during the cutting operation. The slide 9 is a separate part that remains hooked in place over the safety-belt to keep the safety-belt unwrinkled when the frame 2 is pulled transversely over the safety-belt.

Figure 4:
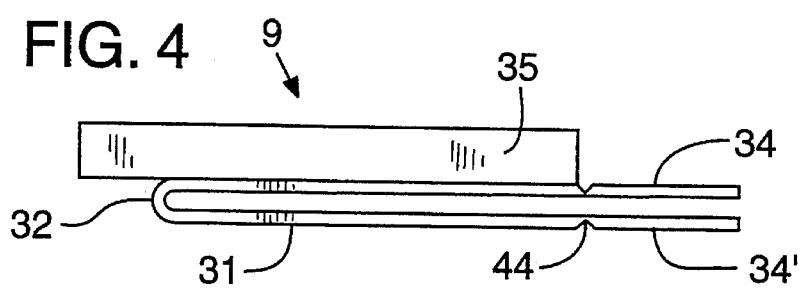
FIG. 4 is a side elevational view of a slide portion of the safety-belt cutter shown in FIG. 1.
Figure 5:
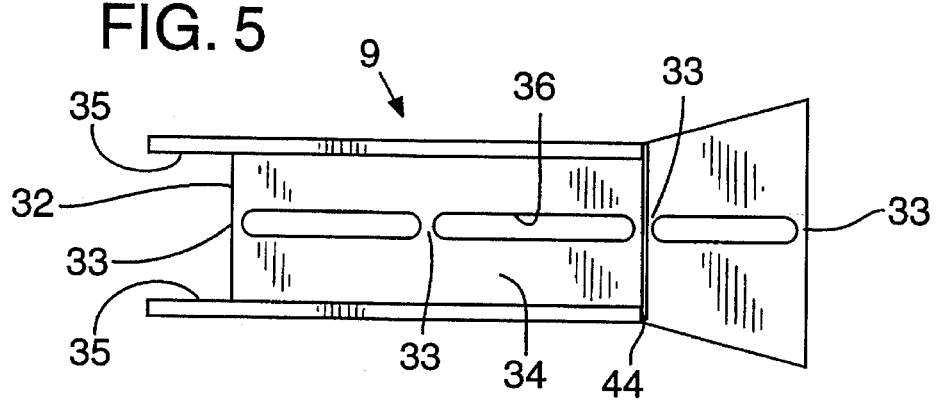
FIG. 5 is a top plan view of the slide portion shown in FIG. 4.

As illustrated in FIGS. 4 and 5, the slide 9 has a U-shaped portion 31 with a base 32 and a pair of parallel legs 34, 34' extending therefrom. The U-shaped portion 31 opens towards the pulling direction 10 (see FIG. 2). Guides 35 extend upwardly from the opposite sides of the upper leg 34 of the U-shaped portion 31 to engage the outer side surfaces of the upper frame portion 7 (see FIGS. 1 and 3a). The legs 34, 34' are perforated by a plurality of elongate slits 36 extending end-to-end down the legs. The slits 36 are spaced apart by narrow bridge connections 33. The slits 36 define a path along which the blade 4 is adapted to run to cut the safety-belt.

As shown in FIGS. 1 and 3a, the guard means 5 for preventing inadvertent cutting of the safety-belt is installed on the upper frame portion 7. The guard means has an elongate body with a removal ring 39 at one end and a sheath 40 extending downwardly from the opposite end. The guard means is releasably retained within a channel 37 in the upper surface of the upper frame portion 7. The channel 37 extends from the pulling ring 3 toward the second end of the upper frame portion. The guard means 5 has opposing downwardly sloped longitudinal edges 43 that are releasably fitted into undercut sloped channel side walls 38 to form a dovetail-type joint.

When installed in the channel, as shown in FIG. 2, the guard means removal ring 39 fits within the upper frame portion pulling ring 3. The guard means removal ring 39 is upwardly lifted to detach the guard means 5 from the frame portion 7 before cutting. The sheath 40 is shaped to define a hollow, approximately 270° circular arc, with the 90° opening in the arcuate sheath oriented away from the pulling ring. An arcuate sheath aperture 41 extending from the lower surface of the channel through the upper frame lower surface receives the sheath when the guard means is installed. The sheath 40 extends through the sheath aperture 41 across the opening 6 and is received with an arcuate recess 42 defined in the upper surface 11 of the lower frame member 7'.

The positioning of the installed sheath is best shown in the second embodiment of FIGS. 7 and 8, wherein the sheath 40a substantially surrounds the cutting edge 22 of the blade 4 to prevent cutting of the belt in the event of inadvertent pulling movements. The positioning of the sheath 40 in the first embodiment shown in FIGS. 1, 2, 3a and 3b is substantially identical.

FIGS. 3a and 3b show the installation of the safety-belt cutter upon the safety-belt 8. FIG. 3a shows the installation assembly of the cutter upon the belt 8. For clarity, the upper and lower frame portions are shown completely disconnected. Ordinarily all of the parts are preferably pre-assembled at a factory, with the single tenon 20 at the second end of the frame being snapped into its tenon hole 21.

As shown in FIG. 2, the lower frame portion 2 has an integrally cast thin portion defining a hinge 45 adjacent the pulling ring 3'. The hinge 45 permits the lower frame portion pulling ring 3' to swing away from the upper frame portion pulling ring 3 to facilitate the installation of the safety-belt 8 within the opening 6, as shown in FIG. 3a. The installation takes place by passing the safety-belt between the legs 34, 34' of the U-shaped portion 31. As best shown in FIG. 4, the U-shaped portion lower leg 34' also has a hinge 44 located adjacent the lower frame portion hinge 45 in the assembled cutter. During assembly, the hinge 44 permits the end portion of the lower leg 34' to swing away from the upper leg 34 (see FIG. 2) to facilitate the installation of the safety-belt between the legs. Installation is completed by pressing the upper frame 7 and the lower frame 7' together so the pair of tenons 18 of the upper frame snap into the tenon holes 19 of the lower frame to form a permanent "snap-on" tenon joint.

While the legs 34, 34' of the U-shaped portion closely support the safety-belt, the safety-belt can 10 slide freely through the cutter.

When the guard means 5 is removed and pulling rings 3, 3' are pulled upon, the frame portions 7, 7' move transversely over the safety-belt 8 as the blade 4 moves transversely through the safety-belt 8. The legs 34, 34' of the U-shaped portion extend from the base 32 in the direction of cutting 10 so that the U-shaped portion 31 remains "hooked" over the safety-belt during cutting. The slide guides 35 guide the upper frame portion 7 relative to the slide 9 during the transverse cutting movement of the upper and lower frame portions 7, 7'. The blade cuts the safety-belt and the bridge connections 33 of the slide at the same time, following the path defined by the slits 36. During cutting, the wedge 14 spreads the slide halves apart. The close support of the safety-belt between the legs of the U-shaped portion constrains the safety-belt to keep the safety-belt substantially taut and unwrinkled within the safety-belt cutter during cutting. After the cutting, the separated slide halves are detached from the safety-belt cutter.

As discussed above, the alternative second embodiment shown in FIGS. 6–9 is similar in most aspects to the first embodiment shown in FIGS. 1, 2, 3a and 3b. One difference, as best shown in FIG. 6, is the slight angling of the pulling rings 3a, 3a from the plane of the upper and lower frame portions 7a, 7'a. The guard means removal ring 39a is slightly exposed above the angled pulling ring 3a to permit somewhat more convenient access to the removal ring.

The safety-belt cutter is preferably constructed from molded plastic to form an inexpensive, durable and lightweight safety-belt cutter. The guard means or the entire cutter may be brightly colored for ease of identification.

This detailed description is set forth only for purposes of illustrating an example of the present invention and should not be considered to limit the scope of the invention in any way. Clearly, numerous additions, substitutions and modifications can be made to this example without departing from the scope of the invention. I claim any and all of such which fall within the scope of the following claims.

I claim:

1. A safety-belt cutter for cutting a safety-belt in the event of an emergency, the safety-belt cutter comprising:

a frame having an opening adapted for receiving a safety-belt therethrough, the frame completely encircling said safety-belt;

a cutting blade having a cutting edge attached to the frame and protruding into the opening, the blade engageable with the safety-belt disposed in said opening to cut the same upon movement of said frame transversely over said safety-belt positioned in said opening;

a slide disposed within the frame opening for receiving and closely supporting the safety-belt, support portions of the slide constraining the safety-belt to keep the safety-belt taut during the cutting movement of said blade; and a guard means detachably secured to the frame and including a sheath positioned in front of the cutting blade cutting edge to prevent cutting of the safety-belt from inadvertent pulling movements upon said frame, the guard means detachable from the frame to remove said sheath from in front of the cutting edge to permit cutting of the safety belt.

2. A safety-belt cutter according to claim 1, the frame comprising an upper frame portion and a lower frame portion with the opening therebetween, the upper frame portion having a pulling ring portion at a first end thereof.

3. A safety-belt cutter according to claim 2, the lower frame portion having a pulling ring portion at a first end thereof, the lower frame pulling ring portion aligning with the upper frame pulling ring portion when the upper and lower frame portions are attached together.

4. A safety-belt cutter according to claim 2, the upper frame portion having an upper surface defining a channel for receiving said guard means and a lower surface, the channel extending from the upper frame pulling ring portion toward a second end of the upper frame portion, said upper frame portion having an aperture therethrough from said upper surface to said lower surface of the upper frame portion; and said guard means having a removal ring disposed within said upper frame pulling ring portion and a body portion fitting within said channel, the body portion attaching into the channel adjacent the upper frame pulling ring portion to hold the guard means removal ring within the upper frame pulling ring portion, the sheath being disposed on the guard means at a second end opposite the removal ring, the sheath being received through said aperture and extending into the opening in front of the blade to prevent the blade from cutting the safety-belt disposed within the frame.

5. A safety-belt cutter according to claim 4, the upper frame portion at the second end thereof having a triangular wedge protruding into the opening from the lower surface to engage behind the blade, the wedge being attached to the lower frame portion.

6. A safety-belt cutter according to claim 5, wherein the wedge has a central slot for receiving said blade, and side walls diverging diagonally from said blade received in said slot.

7. A safety-belt cutter according to claim 5, wherein the triangular wedge attaches to the lower frame portion at a tenon joint.

8. A safety belt cutter according to claim 2, wherein the upper and lower frame portions are attached together by tenons.

9. A safety-belt cutter according to claim 2, wherein the lower frame portion has a hinge to permit the frame to open for convenient reception of the safety-belt.

10. A safety-belt cutter according to claim 1, the slide having guides extending along two opposing sides of the frame to guide the frame over the slide during the cutting movement of the frame.

11. A safety-belt cutter according to claim 1, wherein the slide has a plurality of centrally-located slits which define a cutting path for the blade.

12. A safety-belt cutter according to claim 1, wherein the sheath has an arcuate shape that substantially encloses the blade cutting edge when the guard means is installed.

13. A safety-belt cutter according to claim 1, wherein the blade has an elongate parallelogrammic shape, with the cutting edge formed on an end edge of the parallelogrammic shape.

14. A safety-belt cutter according to claim 13, wherein the frame is elongate, and the blade cutting edge is disposed perpendicular to the length of the frame.

15. A safety-belt cutter suitable for use in the event of an emergency to cut a safety-belt, the safety-belt cutter comprising:

a frame part having an elongate upper frame portion and an elongate lower frame portion, the upper and lower frame portions each having a pulling ring portion at a first end thereof, the pulling ring portions aligning when the upper and lower frame portions are attached together, the upper and lower frame portions being attached adjacent the ring portions thereof by tenon means;

the upper frame and the lower frame portions defining an opening therebetween;

the lower frame portion having at a second end thereof a blade with a vertically oriented cutting edge protruding into the opening and facing the lower frame pulling ring portion, the lower frame portion further having an integrally cast hinge therein adjacent the lower frame pulling ring portion thereof to permit said ring portion of said lower frame portion to open away from the upper frame portion to facilitate the installation of the safety-belt within the opening;

the upper frame portion having a second end, a triangular wedge protruding from said upper frame portion adjacent said second end into the opening to engage behind the blade, the wedge being fastened to the lower frame portion;

the upper frame portion having an upper surface defining a channel extending from the upper frame pulling ring portion toward the second end of the upper frame portion and a lower surface, said channel having side edges, at least one of the side edges being undercut, said upper frame portion having an aperture therethrough from the upper surface to the lower surface of the upper portion;

guard means for preventing inadvertent cutting of said belt, said guard means comprising an elongate body adapted to fit within said channel and having a pair of opposite sides, at least one of the opposite sides having a dovetail joint surface extending into the said undercut channel side edge to hold said guard means body within said channel, said guard means having a removal ring at a first end fitting within said upper frame pulling ring portion, said guard means having at a second end, a sheath, said sheath extending through the aperture and in front of said blade cutting edge to prevent the movement of said blade, said guard means being removable from said upper frame portion by lifting upwardly on said removal ring to lift said body from said channel and extract said sheath through said aperture;

a slide for supporting the safety-belt, said slide having a U-shaped portion having a base and a pair of parallel legs extending therefrom disposed within said opening, the base of the U-shaped portion facing said blade cutting edge, the U-shaped portion closely and slidably receiving the safety-belt between said legs thereof, said legs being perforated by a plurality of elongate slits extending end-to-end down the legs, the slits being spaced apart by narrow connections, the slits being aligned with the blade cutting edge to define a path along which the blade is adapted to run to cut the safety-belt and said connections, the wedge on said upper frame portion engaged behind the blade to follow the blade through the slits to urge the slide apart, close supporting of the safety-belt by the slide maintaining safety-belt tautness during cutting; and the slide further comprising guides extending upwardly from the U-shaped portion, the guides engaging the upper frame portion at outer sides thereof to guide the upper frame portion relative to the slide during the cutting movement of said frame part.

* * * * *